United States Patent [19]
Ransom

[11] Patent Number: 5,615,666
[45] Date of Patent: Apr. 1, 1997

[54] FUEL CONCENTRATING AND CONSERVING DEVICE FOR BARBECUE AND CHARCOAL GRILLS

[76] Inventor: Harry T. Ransom, 730 Elliot St., Longmont, Colo. 80501

[21] Appl. No.: 611,239

[22] Filed: Mar. 5, 1996

[51] Int. Cl.⁶ ........................................ A47J 37/00
[52] U.S. Cl. ...................... 126/25 R; 126/25 B; 126/9 R
[58] Field of Search ................... 126/29, 30, 9 R, 126/9 B, 25 R, 25 B

[56] References Cited

U.S. PATENT DOCUMENTS

| | | | |
|---|---|---|---|
| 1,273,840 | 7/1918 | Fassett | 126/29 |
| 2,998,814 | 9/1961 | Forsberg. | |
| 3,101,080 | 8/1963 | Lorbacher. | |
| 3,266,478 | 8/1966 | Booth. | |
| 4,186,716 | 2/1980 | Baker et al. | 126/29 |
| 4,535,748 | 8/1985 | Hunerwadel. | |
| 4,592,334 | 6/1986 | Logan, Jr. . | |
| 4,777,927 | 10/1988 | Stephen et al. . | |
| 5,074,279 | 12/1991 | Sainsbury. | |
| 5,293,859 | 3/1994 | Lisker. | |
| 5,331,942 | 7/1994 | McDonald et al. . | |
| 5,404,864 | 4/1995 | Kent, Jr. . | |

Primary Examiner—James C. Yeung
Attorney, Agent, or Firm—Emery L. Tracy

[57] ABSTRACT

A device for concentrating and conserving a fuel source in a cooking appliance is provided. The cooking appliance has a fuel supporting surface, an appliance side wall about the fuel supporting surface and a cooking surface supported substantially between the side wall and above the fuel supporting surface. The cooking surface receives food items to be cooked. The device comprises a free-standing fuel concentrating apparatus supported solely upon the fuel supporting surface for selectively concentrating the fuel source beneath at least a portion of the cooking surface. The concentrating apparatus creates a plurality of fuel enclosures such that loading at least two of the fuel enclosures and the ignition and combustion of the fuel source within one of these loaded fuel enclosures saves ignition and combustion of the fuel source located within any adjacent fuel source area.

15 Claims, 4 Drawing Sheets

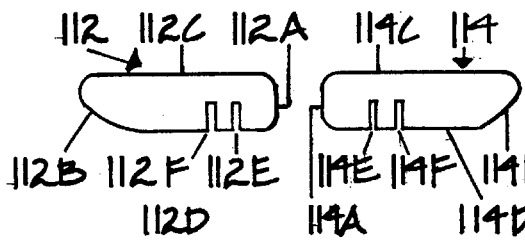
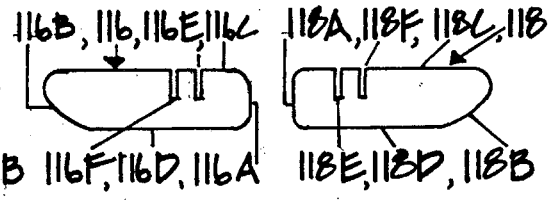
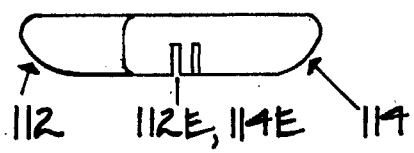
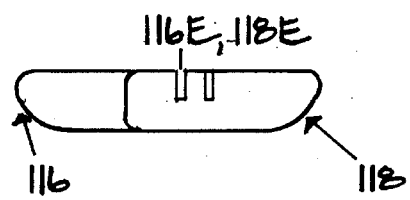
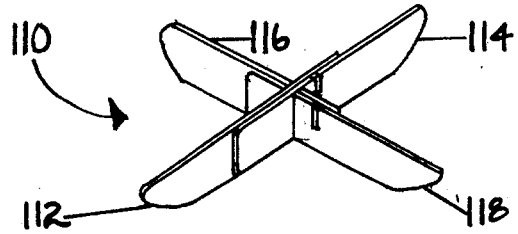
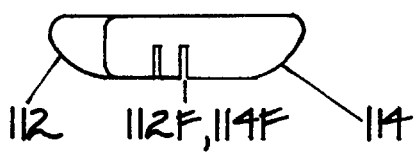
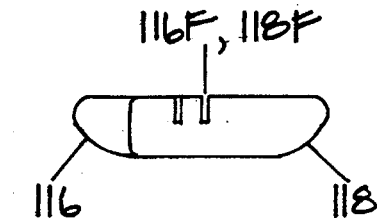
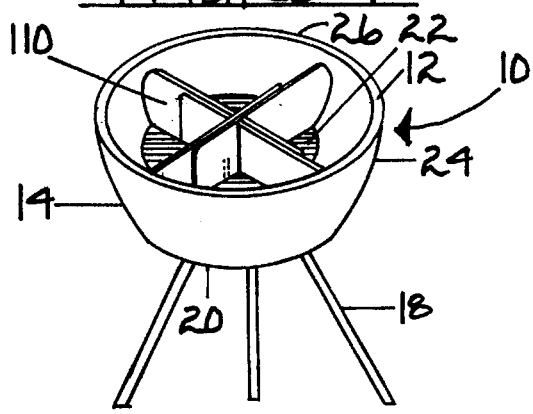
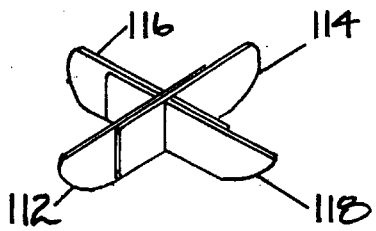

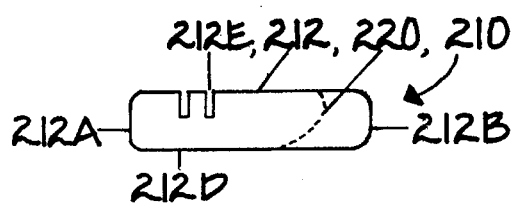
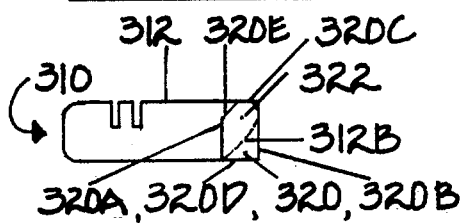
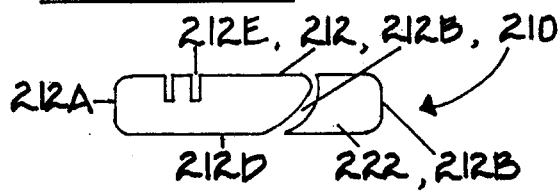
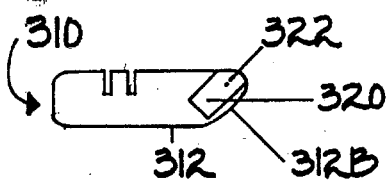
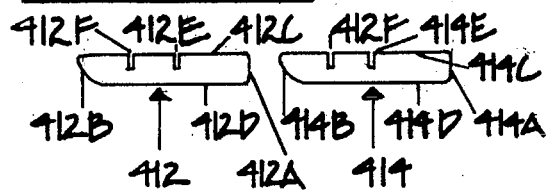
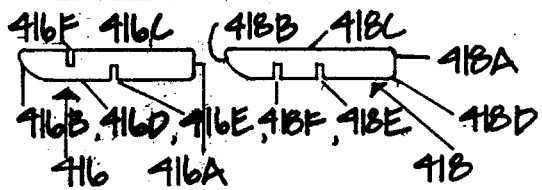
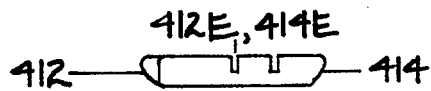
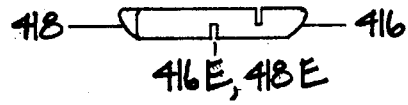
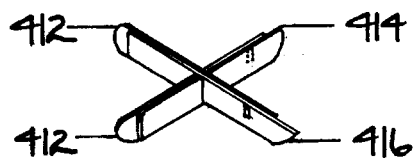
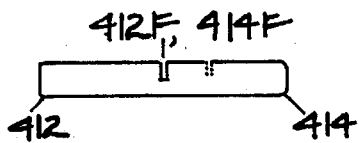
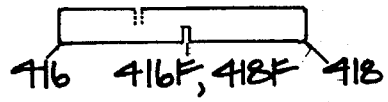
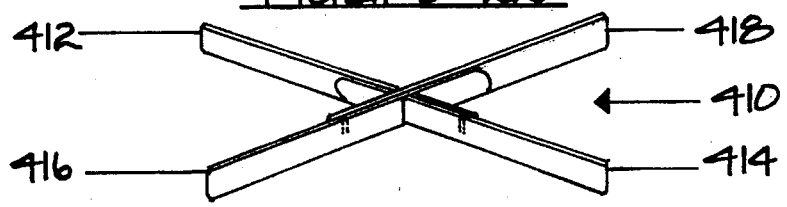

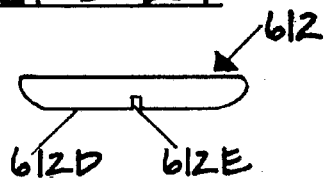
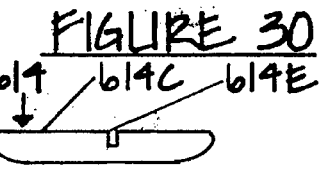
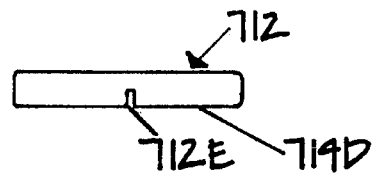
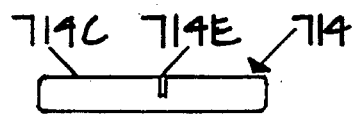
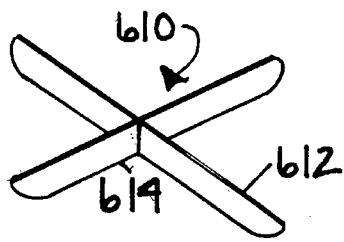
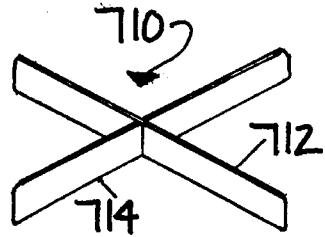
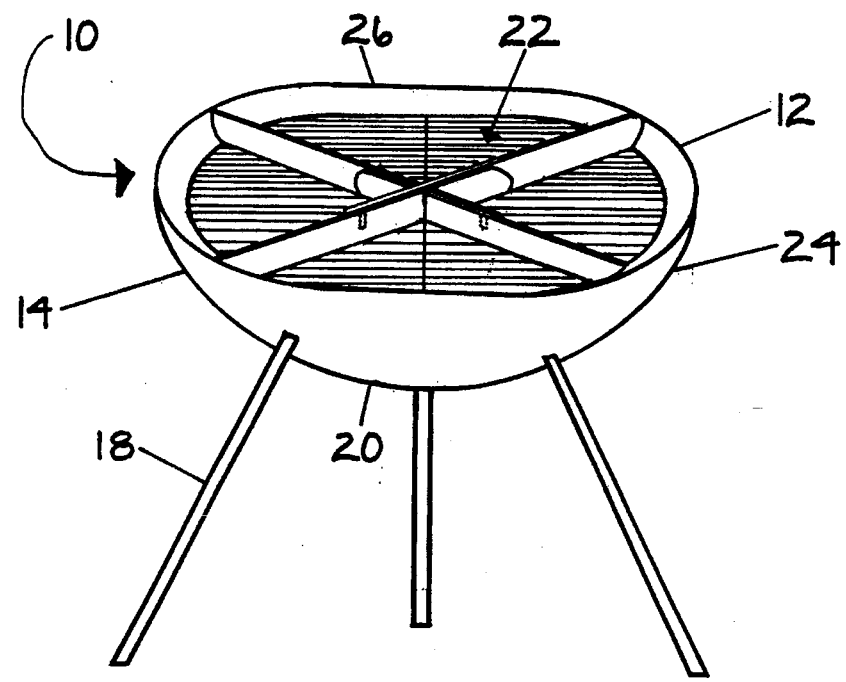

FUEL CONCENTRATING AND CONSERVING DEVICE FOR BARBECUE AND CHARCOAL GRILLS

BACKGROUND OF THE INVENTION

1. Field of the Invention

This invention relates generally to devices for concentrating the position of fuel in barbecues and charcoal grills and, more particularly, it relates to devices which concentrates fuel within a barbecue or grill to conserve fuel during use of the barbecue or charcoal grill.

2. Description of the Prior Art

Barbecue and charcoal grills are a popular choice for preparing tasty and nutritious food for eating. The popularity of these grills continues to increase due to the health conscious public realizing the benefits of grill cooking.

Many charcoal grills are designed to prepare and cook many food items at a time. However, more often than not, the grill owner will only be cooking for two or less people such that much of the actual cooking surface is not utilized on any one occasion. Unfortunately, much fuel or charcoal tends to be wasted since, until the present invention, charcoal briquettes or other fuel sources must be poured into the grill, bunched beneath the food to be cooked or spread around, and partially wet with a flammable charcoal lighter fluid to initiate combustion of the charcoal. Because heat tends to rise vertically and the design of most grills impedes air flow, it is difficult to get a charcoal fire going with only a thin layer of briquettes. The usual result of such an attempt is a vast mass of flames which consumes an excessive amount of fluid with most of the heat being lost and wasted.

In order to direct the heat, sometimes the body of the grill is filled to a greater depth than just a thin layer of briquettes. To obtain this, charcoal is poured into the grill to obtain a double or triple layer of briquettes in the grill. While this tends to be more efficient for lighting purposes than a thin layer of charcoal since the fluid is dispersed down through several layers of briquettes, much charcoal is wasted.

With the above methods as described, it would not be possible for the grill user to load the entire grill with charcoal in a single loading and only utilize a portion at a time for multiple cookings. Each time, it will usually be necessary to clean the used coals from the grill and reload the grill with charcoal. Needless to say, such procedures are very time consuming, very messy and are, oftentimes, avoided by the grill user.

The Logan, Jr., U.S. Pat. No. 4,592,334, attempts to solve the problems as described above by providing a charcoal concentrating implement to be placed in an outdoor grill. Unfortunately, the implement as described in the Logan, Jr. patent does not allow the entire grill to be loaded with charcoal such that the user can selectively utilize only certain portions at any given time. In fact, in the perforated implement of the Logan, Jr. patent, if the grill is loaded with charcoal, the charcoal adjacent the implement will tend to ignite due to the heat passing through the perforations. Furthermore, the implement of the Logan, Jr. patent which is a solid member, the implement is not self-supporting but instead must rely on additional hardware. Furthermore, the implement of the Logan, Jr. patent only creates one enclosure for charcoal grill which will not allow the entire grill to be loaded with charcoal for later cookings.

It is an object of the present invention to provide a fuel concentrating and conserving device for charcoal grills which will serve as a firestop between the ignited charcoal and unignited charcoal within the grill such that a grill owner must only periodically load and clean the grill after numerous cookings.

It is another object of the present invention to provide a fuel concentrating and conserving device for charcoal grills which is self-supporting or free-standing within the grill.

It is yet a further object of the present invention to provide a fuel concentrating and conserving device for charcoal grills which is adjustable to grills of different sizes and shapes while maintaining an effective firestop between the ignited charcoal and the unignited charcoal.

It is still a further object of the present invention to provide a fuel concentrating and conserving device for charcoal grills which divides the grill into a plurality of fuel enclosures such that a chimney effect is created by igniting the fuel in at least one of the enclosures to more efficiently burn the charcoal and cook the food.

SUMMARY OF THE INVENTION

The present invention is a device for concentrating a fuel source in a cooking appliance. The cooking appliance has a fuel supporting surface, an appliance side wall about the fuel supporting surface and a cooking surface supported substantially between the side wall and above the fuel supporting surface. The cooking surface receives food items to be cooked.

The device of the present invention comprises a free-standing fuel concentrating means supported solely upon the fuel supporting surface for selectively concentrating the fuel source beneath at least a portion of the cooking surface. The concentrating means creates a plurality of fuel enclosures such that loading at least two of the fuel enclosures and the ignition and combustion of the fuel source within one of these loaded fuel enclosures saves ignition and combustion of the fuel source located within any adjacent fuel source area.

In an embodiment of the present invention, the concentrating means comprises at least two sheet-like bands or plates, each having at least one slot formed therein, with the bands being releasably interconnected to each other. The bands rest upon the fuel supporting surface free from support of the side wall or cooking surface. Furthermore, the bands include an outer edge which conforms to and abuts the side wall of the cooking appliance. This relationship between the outer edge and the side wall creates a firestop between the outer edge and the side wall. Additionally, the bands are releasably interconnected to form four fuel enclosures which can be of different or equal sizes.

In another preferred embodiment, the device of the present invention comprises band members having a top edge, a bottom edge opposite the top edge, a first side edge between the top edge and the bottom edge and a second side edge opposite the first edge. The device further includes a score line extending between the top edge and the bottom edge. The score line allowing a removable portion of the band member to be frangible with the remaining portion. The score line is adjacent the second edge so that the removable portion can be easily removed so that the device is insert able in differently-sized fireboxes.

In yet another preferred embodiment, the device of the present invention comprises band members having a top edge, a bottom edge opposite the top edge, a first side edge between the top edge and the bottom edge and a second side edge opposite the first edge, the second edge having a curve to accommodate a cooking appliance side wall which is correspondingly curved. The device further includes an extension element rotatably mounted to the band member adjacent the second edge such that the element is rotatable to create a secondary second edge to accommodate a cooking appliance side wall which is correspondingly substantially straight.

The present invention further includes a method of concentrating and conserving fuel in a cooking appliance. The cooking appliance has a fuel supporting surface, an appliance side wall about the fuel supporting surface and a cooking surface supported substantially between the side wall and above the fuel supporting surface.

The method of the present invention comprises providing at least two band members releasably interconnectable to each other and forming a concentrating device with the band members, the device comprising four fuel enclosures for loading fuel. Next, the fuel in at least one of the fuel enclosures is ignited wherein the ignition of the fuel in the desired fuel source area maintains the remaining fuel source in an unignited state.

BRIEF DESCRIPTION OF THE DRAWINGS

FIG. 1 is a side view illustrating a first member and a second member of a first embodiment of the charcoal concentrating and conserving device of the present invention;

FIG. 2 is a side view illustrating a third member and a fourth member of the first embodiment of the device of the present invention;

FIG. 3 is a side view illustrating the relationship between the first member and the second member in forming the first embodiment of the device of the present invention for use in a larger-sized grill;

FIG. 4 is a side view illustrating the relationship between the third member and the fourth member in forming the first embodiment of the device of the present invention for use in a larger-sized grill;

FIG. 5 is a perspective view of the first embodiment of the device of the present invention illustrating the third and fourth member receiving the first and second member to form the completed free-standing concentrating and conserving device ready for insertion into a larger-sized grill;

FIG. 6 is a side view illustrating the relationship between the first member and the second member in forming the first embodiment of the device of the present invention for a smaller-sized grill;

FIG. 7 is a side view illustrating the relationship between the third member and the fourth member in forming the first embodiment of the device of the present invention for a smaller-sized grill;

FIG. 8 is a perspective view of the first embodiment of the device of the present invention illustrating the third and fourth member receiving the first and second member to form the completed free-standing concentrating and conserving device ready for insertion into a smaller-sized grill;

FIG. 9 is a perspective view of the first embodiment of the fuel concentrating and conserving device of the present invention within a grill having a substantially circular cross-section with side walls being rounded from a charcoal supporting surface to an upper edge;

FIG. 10 is a side view of a second embodiment of the device of the present invention similar to the first embodiment illustrating a member having a perforation or score line for removing a portion of the member in order to correctly size the device to fit according to grill size;

FIG. 11 is a side view of the second embodiment of the device of the present invention similar to FIG. 12 with the portion broken away from the rest of the member;

FIG. 12 is a side view of a third embodiment of the device of the present invention wherein the members include a rotating extension portion to allow each of the members to abut against a respective side wall of a grill having side walls perpendicular to a charcoal supporting surface;

FIG. 13 is a side view of the third embodiment of the device of the present invention wherein the extension portion is rotated in a non-extending manner to accommodate a grill similar to the grill FIG. 9;

FIG. 14 is a side view illustrating a first member and a second member of a fourth embodiment of the charcoal concentrating and conserving device of the present invention;

FIG. 15 is a side view illustrating a third member and a fourth member of the fourth embodiment of the device of the present invention;

FIG. 16 is a side view illustrating the relationship between the first member and the second member in forming the fourth embodiment of the device of the present invention;

FIG. 17 is a side view illustrating the relationship between the third member and the fourth member in forming the fourth embodiment of the device of the present invention;

FIG. 18 is a perspective view of the fourth embodiment of the device of the present invention illustrating the third and fourth member receiving the first and second member to form the completed free-standing concentrating and conserving device ready for insertion into a rounded side wall grill;

FIG. 20 is a side view illustrating the relationship between the first member and the second member in forming a fifth embodiment of the device of the present invention;

FIG. 21 is a side view illustrating the relationship between the third member and the fourth member in forming a fifth embodiment of the device of the present invention;

FIG. 22 is a perspective view of the fifth embodiment of the device of the present invention illustrating the third and fourth member receiving the first and second member to from the completed free-standing concentrating and conserving device ready for insertion into a grill having side walls which are substantially perpendicular to a charcoal supporting surface;

FIG. 29 is a side view of a seventh embodiment of the device of the present invention illustrating a first member of the device;

FIG. 30 is a side view of the seventh embodiment of the device of the present invention illustrating a second member of the device;

FIG. 31 is a side view of an eighth embodiment of the device of the present invention illustrating a first member;

FIG. 32 is a side view of the eighth embodiment of the device of the present invention illustrating a second member;

FIG. 33 is a perspective view of the seventh embodiment of the device of the present invention illustrating the first member receiving the second member to from the completed free-standing concentrating and conserving device;

FIG. 34 is a perspective view of the eighth embodiment of the device of the present invention illustrating the first member receiving the second member to from the completed free-standing concentrating and conserving device; and FIG. 35 is a perspective view of the fuel concentrating and conserving device of the present invention within a grill having an oval configuration.

DETAILED DESCRIPTION OF THE PREFERRED EMBODIMENTS

Figure 19:
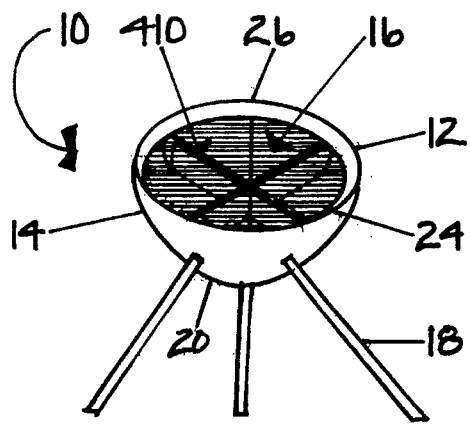
FIG. 19 is a perspective view of the fourth embodiment of the fuel concentrating and conserving device of the present invention within a grill having a substantially circular cross-section with side walls being rounded from a charcoal supporting surface to an upper edge.
Figure 23:
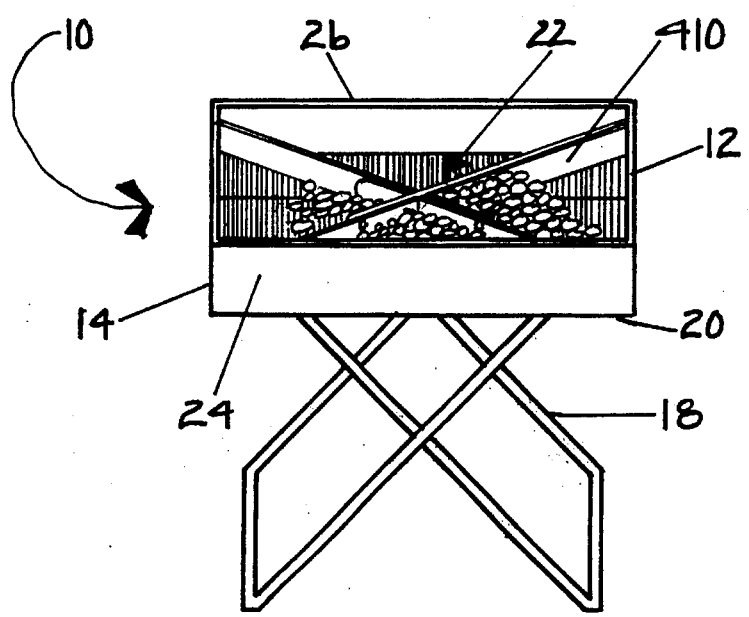
FIG. 23 is a perspective view of the fifth embodiment of the fuel concentrating and conserving device of the present invention within a grill having a substantially rectangular cross-section with side walls which are substantially perpendicular to a charcoal supporting surface.

As illustrated in FIGS. 9, 19, 23, and 35, the present invention is a device, indicated generally at 10, for concentrating and conserving fuel, especially charcoal, in a barbecue or outdoor grill 12. Typically, the grill 12 is round, oval or rectangular and includes a firebox 14, a cooking surface 16, and a plurality of legs 18 for supporting the firebox 14. The firebox 14 is generally constructed of a material capable of withstanding high heat, such as that heat generated by burning charcoal or wood products. In many instances, this material is steel or a steel composite, however, other materials, such as other metals or ceramics, are also within the scope of the present invention.

The firebox 14 includes a substantially flat or slightly concave bottom wall 20, which generally serves as a collecting area for burnt charcoal or fuel, a generally horizontal fuel supporting grate 22 supported above the bottom wall 20 and at least one side wall 24 extending in a general upward direction from the bottom wall 20 to form an upper edge 26 of the firebox 14. The side wall 24 is attached to the bottom wall 20 in a known fashion by means including welding, bolts or other fastening means, or, in the alternative, the side wall 24 could be formed integral to the bottom wall 20 during construction of the firebox 14. The firebox 14 can also be bowl-shaped such that the fuel supporting grate 22 rests on the side wall 24 adjacent the bottom wall 22 of the bowl-shaped firebox 14.

The upper edge 26 formed by the side wall 24 of the firebox 14 can form a variety of geometric shapes including round, oval, square, rectangular, etc. The cooking surface 16 is generally a grill-like structure and provides a flat, horizontal cooking surface. A plurality of support members (not shown) attached to or formed in the side wall 24 of the firebox 14 supports the cooking surface 16 over bottom wall 24 of the firebox 14. The cooking surface 16 is usually a series of parallel bars with spaces in between the bars or two groups of parallel bars at right angles to each other with openings all over the surface to be used for cooking so that the heat and flames from the burning fuel in the firebox 14 can cook the food. The cooking surface 16 is conveniently removable from the firebox 14 for the purpose of cleaning or putting new charcoal in the firebox 14.

Charcoal grills are generally designed with the apparent expectation that most of the cooking surface 16 will be located above burning charcoal briquettes so that most of a the cooking surface 16 can be utilized. Charcoal grills are made in different sizes and are usually selected on the basis of having a sufficient cooking surface are for the largest expected crowd for which cooking will be done. This avoids the purchase of a small grill for one or two people and a larger grill for larger groups of people. The device 110 of the present invention provides a means for utilizing a larger grill in cooking for a small number of people while at the same time improving the performance of the grill and reducing the amount of fuel needed to cook with the grill.

In a first embodiment, as illustrated in FIGS. 1–9, the device 110 of the present invention comprises a first grill member 112, a second grill member 114, a third grill member 116 and a fourth grill member 118. Each of the grill members 112, 114, 116, 118 are preferably comprised of a flat, elongated material which can withstand temperatures typically produced by burning fuel in an outdoor cooking grill. In many instances, like the firebox 14, the material for the grill members 112, 114, 116, 118 is steel or a steel composite, however, other materials, such as other metals or ceramics, are also within the scope of the present invention.

The first grill member 112 includes a first side edge 112a, a second side edge 112b, a top edge 112c and a bottom edge 112d. The second grill member includes a first side edge 114a, a second side edge 114b, a top edge 114c and a bottom edge 114d. The third grill member includes a first side edge 116a, a second side edge 116b, a top edge 116c and a bottom edge 116d. The fourth grill member includes a first side edge 118a, a second side edge 118b, atop edge 118c and a bottom edge 118d. The top edge 112c, 114c, 116c, 118c of the respective grill member 112, 114, 116, 118 is preferably substantially parallel to the corresponding bottom edge 112d, 114d, 116d, 118d on the same respective grill member 112, 114, 116, 118. The first edge 112a, 114a, 116a, 118a of each grill member is preferably substantially perpendicular to the corresponding top edge 112c, 114c, 116c, 118c and bottom edge 112d, 114d, 116d, 118d on the same respective grill member 112, 114, 116, 118. The second edge 112b, 114b, 116b, 118b of the respective grill member I1124, 114, 116, 118 is preferably curved to correspond to the curvature of the side wall of a standard firebox, i.e., the WEBER brand grill. Please note that the second edge of all embodiments described herein is designed to abut the side wall 24 of the firebox 14 to prevent charcoal or other fuel from passing between the side wall 24 and each of the grill members.

As illustrated in FIG. 1, in the first embodiment, the first grill member 112 includes a pair of slots, namely a first slot 112e and a second slot 112f, with the first slot 112e being positioned proximal to the first side edge 112a relative to the second slot 112f and both slots 112e, 112f being substantially parallel to the first side edge 112a. The second grill member 114 includes a pair of slots, namely a first slot 114e and a second slot 114f with the first slot 114e being positioned proximal to the first side edge 114a relative to the second slot 114f and both slots 114e, 114f being substantially parallel to the first edge 114a. Each slot 112e, 112f, 114e, 114f extends from its respective bottom edge 112d, 114d to approximately halfway through the respective grill member 112, 114 relative to the top edge 112c, 114c.

As illustrated in FIG. 2, the third grill member 116 includes a pair of parallel slots, namely a first slot 116e and a second slot 116f, the first slot 116e being positioned proximal to the first side edge 116a relative to the second slot 116f and both slots 116e, 116f being substantially parallel to the first side edge 116a. The fourth grill member 118 includes a pair of slots, namely a first slot 118e and a second slot 118f, the first slot 118e being positioned proximal to the first side edge 118a relative to the second slot 118f and the both slots 118e, 118f being substantially parallel to the first side edge 118a. Each slot 116e, 116f, 118e, 118f extends from its respective top edge 116a, 118a to approximately halfway through the respective grill member 116, 118 relative to the bottom edge 116d, 118d.

Outdoor WEBER brand grills and other brands have fireboxes which are generally round and have two different diameters, namely, a larger size having an approximately 22.5" diameter and a smaller size having an approximately 18.5". As illustrated in FIGS. 3 and 4, to assemble the grill apparatus 110 to generally conform to the larger-sized grill, the first member 112 and second grill member 114 are positioned adjacently against to each other such that the bottom edges 112d, 114d, top edges 112c, 114c and first slots 112e, 114e are substantially aligned, with the second edge 112b, 114b of each of the respective grill members 112, 114 being positioned away from each other. Next, the third and fourth grill members 116, 118 are positioned adjacently against each other such that the bottom edges 116d, 118d, the top edges 116c, 118c and the first slots 116e, 118e are substantially aligned, with the second edge 116b, 118b of each of the respective grill members 116, 118 being positioned away from each other. Finally, as illustrated in FIG. 5, the first slots 112e, 114e of the respective grill members 112, 114 are positioned within the first slots 116e, 118e of the respective grill members 116, 118 until the bottom edges 112d, 114d, 116d, 118d of the respective grill members 112, 114, 116, 118 align with each other in substantially a single plane to form the cross-like shaped freestanding grill device 110.

If the user desires that the grill device 110 fit within a smaller-sized WEBER brand or similar grill, the above procedure is followed except, as illustrated in FIGS. 6 and 7, that the second slot 112f, 114f, 116f, 118f on the respective grill members 112, 114, 116, 118 are aligned with each other instead of the first slots 112e, 114e, 116e, 118e as described above. Then, as illustrated in FIG. 8, the second slots 112f, 114f of the respective grill members 112, 114 are positioned within the second slots 116f, 118f of the respective grill members 116, 118 until the bottom edges 112d, 114d, 116d, 118d of the respective grill members 112, 114, 116, 118 align with each other in substantially a single plane to form the cross-like shaped freestanding grill apparatus 110 of the first embodiment.

It should be noted that there are other grill sizes and shapes available to consumers besides the WEBER brand grills. In some instances, the side wall 24 are not curved but are, instead, approximately perpendicular to the bottom wall 24 of the firebox 14. If such is the case, the device 110 of the first embodiment can be simply modified such that the first edge 112a, 114a, 116a, 118a of the respective grill member 112, 114, 116, 118 is positioned adjacent the side wall 24 rather than the second edge 112b, 114b, 116b, 118b as described above. Please note that if the grill device 110 is assembled for a grill as described without curved side walls, the larger grill apparatus is constructed by utilizing the second slots 112f, 114f, 116f, 118g instead of the first slots 112e, 114e, 116e, 118e as described above for a WEBER brand grill. Furthermore, the smaller grill apparatus is constructed by utilizing the first slots 112e, 114e, 116e, 118e instead of the second slots 112f, 114f, 116f, 118f as would be utilized in a WEBER brand grill.

As illustrated in FIGS. 10 and 11, in a second embodiment of the grill device 210 of the present invention, the grill device 210 includes four grill members similar to the first embodiment. For purposes of discussion, only a first grill member 212 will be described. However, it should be realized that the remaining three grill members include the same features as described for the first grill member 212.

The first grill member 212 has a first side edge 212a, a second side edge 212b and at least one slot 212e extending substantially half-way through the first grill member 212. At least one of the slots 212e, is positioned in the approximate center of the first grill member 212 for assembly similar to the assembly of the first embodiment.

The second embodiment further includes the first grill member 212 having a rounded score line 220 between the slot 212e and the second side edge 212b. The score line 220 on the first grill member 212 is preferably curved to correspond to the curvature of a side wall of the WEBER brand or similar charcoal grill. However, it is within the scope of the present invention to have a second side edge 212b which is substantially parallel to the first side edge 212a to conform to a grill which has a side wall substantially perpendicular to the fuel supporting grate 22. It is also within the scope of the present invention to have a score line 220 which is either also perpendicular to the bottom edge 212d and the top edge 212c to conform to a smaller-sized grill which has a side wall 24 substantially perpendicular to the fuel supporting grate 22. It is further within the scope of the present invention to have a score line 220 which is neither rounded nor perpendicular to the fuel supporting grate 22.

To assemble the grill device 210, the grill members of the second embodiment are assembled as described in the first embodiment. The grill device of the second embodiment provides further adjustment capabilities in that the grill member can be manipulated along the score line 220 to break a portion of the grill member away to create an auxiliary second side edge 212b'. This adjustment capability allows the device of the present invention to adjust to a variety of grill sizes without the grill user having to purchase additional grill devices.

As stated above, the device 210 of the second embodiment can be constructed similar to the device 110 of the first embodiment by including at least four grill members each having a plurality of slots arranged to form devices for both large and smaller sized grills. Using the increased multitude of grill members to form a device 210 of the second embodiment, the assembly is substantially similar to the assembly of the device 110 for the first embodiment. Of course, as described above, the device 210 of the second embodiment includes score lines 220 for further adjustment capabilities.

As illustrated in FIGS. 12 and 13, in a third embodiment of the grill device 310 of the present invention, the grill device 310 includes four grill members similar to the first embodiment. For purposes of discussion, only a first grill member 312 will be described. However, it should be realized that the remaining three grill members include the same features as described for the first grill member 312.

The first grill member 312 has an extension element 320 rotatably mounted adjacent the second edge 312b of the first grill member 312. The extension element 320 is preferably constructed of the same material as the grill members although other materials are within the scope of the present invention. Furthermore, the extension element 320 is preferably mounted to its respective member 312 by bolt, screw, rivet or other fastening means 322 which will provide for rotational movement of the element 320.

Each extension element 320 includes a first edge 320a, a second edge 320b opposite and substantially parallel to at least a portion office first edge 320a, a third edge 320c between and substantially perpendicular to the first edge 320a and the second edge 320b, and a fourth edge 320d opposite and substantially parallel to the third edge 320c. The extension element 320 is designed and shaped, as illustrated in FIG. 12, to allow a grill device as described in the first embodiment to conform to a firebox 14 having a side wall 24 perpendicular to the bottom wall 20. When not in use or when in use for a WEBER brand grill, the extension element 320 can be rotated back and will generally conform to the edges of each grill member 312. The first edge 320a includes an angled edge 320e in order to obtain such a result. Friction between any overlapping portion 324 of the extension element 320 and the element 320 will tend to maintain the desired position of the extension element 320 whether extended or rotated back as described above.

As illustrated in FIGS. 14–23, in a fourth embodiment of the grill device 410 of the present invention, the grill device 410 includes a first grill member 412, a second grill member 414, a third grill member 416 and a fourth grill member 418. Each of the grill members 412, 414, 416, 418, similar to the first embodiment, are preferably comprised of a flat, elongated material which can withstand temperatures typically produced by burning fuel in an outdoor cooking grill. In many instances, like the firebox 14, the material for the grill members is preferably steel or a steel composite, however, other materials, such as other metals or ceramics, are also within the scope of the present invention.

The first grill member 412 includes a first side edge 412a, a second side edge 412b, a top edge 412c and a bottom edge 412d. The second grill member 414 includes a first side edge 414a, a second side edge 414b, a top edge 414c and a bottom edge 414d. The third grill 416 member includes a first side edge 416a, a second side edge 416b, a top edge 416c and a bottom edge 416d. The fourth grill member 418 includes a first side edge 418a, a second side edge 418b, a top edge 418c and a bottom edge 418d. The top edge 412c, 414c, 416c, 418c of the respective grill member 412, 414, 416, 418 is preferably substantially parallel to the corresponding respective bottom edge 412d, 414d, 416d, 418d on the respective grill member 412, 414, 416, 418. The first side edge 412a, 414a, 416a, 418a of each respective grill member 412, 414, 416, 418 is preferably substantially perpendicular to the corresponding respective top edge 412c, 414c, 416c, 418c on the respective grill member 412, 414, 416, 418. The second side edge 412b, 414b, 416b, 418b of each grill member is preferably curved to correspond to the curvature of the side wall of a standard firebox, i.e., the WEBER brand or similar grill. Please note that the second side edge 412b, 414b, 416b, 418b is designed to abut the side wall 24 of the firebox 14 to prevent charcoal or other fuel, flame and fire from passing between the side wall 24 and each of the grill members.

As illustrated in FIG. 14, in the fourth embodiment, the first grill member 412 includes a pair of slots, namely a first slot 412e and a second slot 412f, with the first slot 412e being positioned proximal to the first side edge 412a relative to the second slot 412f and both slots 412e, 412f being substantially parallel to the first side edge 412a, The second grill member 414 includes a pair of slots, namely a first slot 414e and a second slot 414f with the first slot 414e being positioned proximal to the first side edge 414a relative to the second slot 414f and both slots 414e, 414f being substantially parallel to the first side edge 414a. Each slot 412e, 412f, 414e, 414f extends from its respective top edge 412c, 414c, approximately halfway into its respective grill member 412, 414.

As illustrated in FIG. 15, the third grill member 416 includes a pair of parallel slots, namely a first slot 416e and a second slot 416f, the first slot 416e being positioned proximal to the first side edge 416a relative to the second slot 416f and both slots 416e, 416fbeing substantially parallel to the first side edge 416a. The fourth grill member 418 includes a pair of slots, namely a first slot 418e and a second slot 418f, the first slot 418e being positioned proximal to the first side edge 418a relative to the second slot 418f and the both slots 418e, 418f being substantially parallel to the first side edge 418a. Each slot 416e, 418e, 418f, except for the second slot 416fof the third grill member 416, extends from the respective bottom edge 416d, 418d, approximately halfway into the respective grill member 416, 418. The second slot 416fof the third grill member 416 extends from the top edge 416c, approximately halfway into the third grill member 416. By arranging the slots 416e, 416f, 418e, 418f, as described, the device 410 of the fourth embodiment is conformable to both WEBER brand or similar rounded side wall type grills and perpendicular-sided grills as described further below.

As illustrated hi FIGS. 16 and 17, to assemble the grill device 410 of the fourth embodiment to conform to the rounded side wall type grill, the first grill member 412 and second grill member 414 are positioned adjacent to each other such that the bottom edges 412d, 414d, top edges 412c, 414c and first slots 412e, 414e are substantially aligned, with the second side edge 412b, 414b of the respective grill members 412, 414 being positioned away from each other. Next, the third grill member 416 and the fourth grill member 418 are positioned adjacent each other such that the bottom edges 416d, 418d, the top edges 416c, 418c and the first slots 416e, 418e are substantially aligned, with the second side edge 416b, 418b of the respective grill members 416, 418 are positioned away from each other. Finally, as illustrated in FIG. 18, the aligned first slots 412e, 414e of the respective grill members 412, 414 are positioned within the aligned first slots 416e, 418e of the respective grill members 416, 418 until the bottom edges 412d, 414d, 416d, 418d of the respective grill members 412, 414, 416, 418 align with each other in substantially a single plane to form the cross-like shaped free-standing grill device 410.

If the user desires that the grill device 410 fit within a perpendicular-sided grill, the above procedure is followed except, as illustrated in FIGS. 20 and 21, that the second slot 412f, 414f, 416f, 418f on the respective grill members 412, 414, 416, 418 are aligned with each other instead of the first slots 412e, 414e, 416e, 418e as described above and the first side edge 412a is oppositely opposed to first side edge 414a and first side edge 416a is oppositely opposed to first side edge 418a. Then, as illustrated in FIG. 22, the aligned second slots 412f, 414f of the respective grill member 412, 414 are positioned within the aligned second slots 416f, 418f of the respective grill member 416, 418 until the bottom edges 412d, 414d, 416d, 418d of the respective grill members 412, 414, 416 align with each other in substantially a single plane to form the cross-like shaped freestanding grill device 410.

As illustrated in FIGS. 24–28, in a fifth embodiment of the grill device 510 of the present invention, the grill device 510 includes a first grill member 512, a second grill member 514 and a third grill member 516. Each of the grill members 512, 514, 516, 518, similar to the first embodiment, are preferably comprised of a flat, elongated material which can withstand temperatures typically produced by burning fuel in an outdoor cooking grill. In many instances, like the firebox 14, the material for the grill members 512, 514, 516, 518 is steel or a steel composite, however, other materials, such as other metals or ceramics, are also within the scope of the present invention.

The first grill member 512 includes a first side edge 512a, a second side edge 512b, a top edge 512c and a bottom edge 512d. The second grill member 514 includes a first side edge 514a, a second side edge 514b, a top edge 514c and a bottom edge 514d. The third grill member 516 includes a first side edge 516a, a second side edge 516b, a top edge 516c and a bottom edge 516d. The top edge 512c, 514c, 516c of the respective grill member 512, 514, 516 is preferably substantially parallel to the corresponding respective bottom edge 512d, 514d, 516d on the same respective grill member 512, 514, 5 16. The first side edge 512a, 514a, 516a and the second side edge 512b, 514b, 516b of the respective grill member 512, 514, 516 is preferably substantially perpendicular to the corresponding respective top edge 512c, 514c, 516c of the same respective grill member 512, 514, 516. As above, the second side edge 512b, 514b, 516b is designed and shaped to abut the side wall 24 of the firebox to prevent charcoal or other fuel, fire and flame from passing between the side wall 24 and each of the grill members 512, 514, 516.

Figure 24:
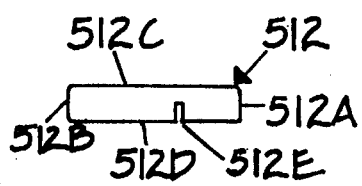
FIG. 24 is a side view of a sixth embodiment of the device of the present invention illustrating a first member of the device.
Figure 25:
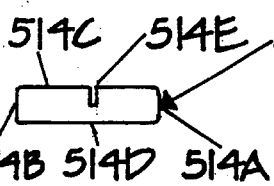
FIG. 25 is a side view of the sixth embodiment of the device of the present invention illustrating a second member of the device.
Figure 26:
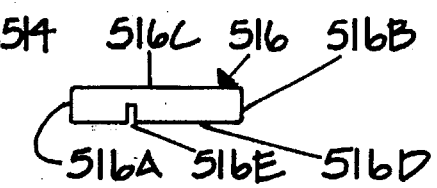
FIG. 26 is a side view of the sixth embodiment of the device of the present invention illustrating a third member of the device.

As illustrated in FIG. 24, in the device 510 of the fifth embodiment, the first grill member 512 includes a slot 512e being substantially parallel to the first and second side edges 512a, 512b. As illustrated in FIG. 26, the third grill member 516 includes a slot 516e being substantially parallel to the first and second side edges 516a, 516b. Each slot 512e, 516e extends from the respective bottom edge 512d, 516e, approximately halfway into the respective grill member 512, 516. As illustrated in FIG. 25, the second grill member 514 also includes a slot 514e substantially parallel to the first and second side edges 514a, 514b. The slot 514e of the second grill member 514 extends from the top edge 514c, approximately halfway into the second grill member 514.

Figure 27:
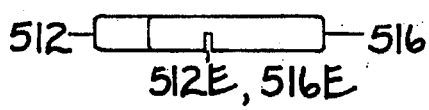
FIG. 27 is a side view of the sixth embodiment of the device of the present invention illustrating the relationship between the first and third member of the device for a grill.
Figure 28:
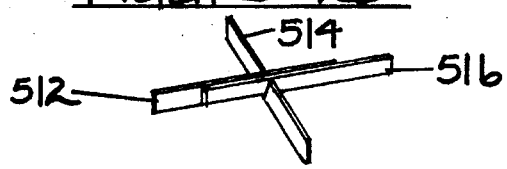
FIG. 28 is a perspective view of the sixth embodiment of the device of the present invention illustrating the first and third members receiving the second members to form the completed free-standing concentrating and conserving device.

As illustrated in FIG. 27, to assemble the grill device 510 to conform to the WEBER-brand or similar round-sided side wall type grill, the first and third grill members 512, 516 are adjacently positioned such that the bottom edges 512d, 516d, top edges 512c, 516c and slots 512e, 516e are substantially aligned, with the second side edge 512b, 516b of the respective grill member 512, 516 being positioned away oppositely from each other. Then, as illustrated in FIG. 28, the aligned slots 512e, 516e of the respective grill member 512, 516 are positioned within the slot 514e of the second grill member 514 until the bottom edges 512d, 514d, 516d of the respective grill member 512, 514, 516 being align with each other in substantially a single plane to form the cross-like shaped freestanding grill apparatus 40.

Now referring to FIGS. 29 and 30, illustrated therein is a sixth embodiment of a grill device 610 of the present invention having a first grill member 612 and a second grill member 614. The sixth embodiment illustrates the present invention in its most basic form. The first grill member 612 includes a slot 612e extending from the bottom edge 612d into the first grill member 612 and the second grill member 614 includes a slot 614e extending from the top edge 614c into the second grill member 614. As illustrated in FIG. 35, to assemble the grill device 610, the slot 612e is inserted into the slot 614e until the bottom edges 612d, 614d of the respective grill members 612, 614 are aligned.

As illustrated in FIGS. 31 and 32, a seventh embodiment of a grill device 710 of the present invention is illustrated. The grill device 710 includes a first grill member 712 and a second grill member 714. Like the sixth embodiment, the seventh embodiment illustrates the present invention in its most basic form. The first grill member 712 includes a slot 712e extending from the bottom edge 712d into the first grill member 712 and the second grill member 714 includes a slot 714e extending from the top edge 714c into the second grill member 714. As illustrated in FIG. 34, to assemble the grill device 710, the slot 712e is inserted into the slot 714e until the bottom edges 712d, 714d of the respective grill members 712, 714 are aligned.

As illustrated, the differences between the sixth embodiment of the grill device 610 and the seventh embodiment of the grill device 710 is that the grill device 610 is shaped, structured and designed for grills having rounded side walls while the grill device 710 is shaped, structured and designed for grills having side walls substantially perpendicular to the bottom walls. As above, the grill devices 610, 710 are designed and shaped to abut the side wall 24 of the firebox to prevent charcoal or other fuel, fire and flame from passing between the side wall 24 and each of the grill devices 610, 710.

In each of the grill devices described in the above embodiments, the grill members extend to a point abutting the side wall of the grill. Thus, generally, four cooking areas are formed by the grill device positioned in the firebox and the side walls of the firebox. It is also within the scope of the present invention to have grill members which do not extend to a point abutting the side wall of the grill. If the grill members do not extend to the side walls, then care must be taken in positioning the charcoal so that adjacent unignited cooking areas do not ignite unintentionally.

Furthermore, each of the grill devices are illustrated such that the grill members are in symmetrical relation with each other, i.e., all grill members are joined together in the approximate center of the grill members. It should be noted that it is within the scope of the present invention to have grill devices which are not in symmetrical relation, i.e., the grill members are not joined together in the approximate center of the grill member but is instead joined closer to either the first or second side edges.

The slots in each of the members in each of the embodiments are preferably cut or formed, having a width of approximately ⅛41, such that the members are rotatable about an axis perpendicular to a longitudinal axis of the members in order to conform to various sized and shaped grills. For instance, as illustrated in FIG. 18, the device of any of the embodiments can either be formed in a cross-like shape such that interconnected members are substantially perpendicular to each other for use in round grills. Or, as illustrated in FIG. 22, the device can be arranged such that the interconnected members are not substantially perpendicular to each other for use in oval or rectangular grills.

Preferably, each of the grill members have a height between approximately two to six inches. In use, each of the cooking areas can be loaded with between one to three layers of charcoal briquettes prior to igniting the charcoal. If the user is only cooking for a few people or only a small portion of food is being prepared, only one cooking area may need to be ignited and only six to eight charcoal briquettes need to be used. Due to the material type, thickness of the grill members, and the second edge of each grill member abutting the side walls, a firestop barrier is created between the ignited cooking area and the other unignited cooking areas of charcoal will not ignite and can be saved for a future cooking time.

As previously mentioned, the height of the grill members is up to approximately four inches thereby giving each cooking area of the device a depth of approximately four inches. With an approximate depth of four inches, the amount of charcoal placed in each cooking area can be varied depending on the desired cooking temperature. If the user desires a higher cooking temperature, the user can load the cooking area with nearly four inches of charcoal. Or, if the user desires a lower cooking temperature, the user can load the cooking area with less charcoal. Furthermore, in grills without underside vents, the depth of approximately four inches provides a chimney effect such that air is directed down the unignited cooking areas through the grate toward the bottom of the grill. If the grill has underside vents, the air is directed up through the vents. Since heat tends to rise, the ignited charcoal keeps the air moving back through the grate and the ignited fuel enclosure by directing the heated air upward to cook the food. The air continuously circulates within the firebox which allows for shorter cooking times and better cooked food. In fact, most food can be prepared in less than half the time without the invention of the present application with total cooking time, from the time the charcoal is ignited to the time when the food has finished cooking, approximately equaling that of a gas grill.

In addition, if a user desires to prepare food for a larger number of people, or desires to prepare a larger quantity of food, three or four quadrants can be ignited. Many times, at least one quadrant is desired to be unignited since many users desire a cool spot away from direct heat.

Furthermore, the grill apparatus of the present invention can convert an outdoor grill into a convection oven. First, only one or two adjacent quadrants are ignited. Second, the food is placed in the opposite, unignited quadrants away from direct heat. Finally, the food is occasionally turned to expose all sides to the heat. The chimney effect of the grill apparatus of the present invention together with the charcoal lid provide an indirect cooking source for the food.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A device for concentrating and conserving a fuel source in a cooking appliance, the cooking appliance having a fuel supporting surface, an appliance side wall about the fuel supporting surface and a cooking surface supported substantially between the side wall and above the fuel supporting surface, the cooking surface receiving food items to be cooked, the device comprising:

free-standing fuel concentrating means supported solely upon the fuel supporting surface for selectively concentrating the fuel source beneath at least a portion of the cooking surface, the concentrating means creating a plurality of fuel enclosures such that loading at least two of the fuel enclosures and the ignition and combustion of the fuel source within one of these loaded fuel enclosures saves ignition and combustion of the fuel source located within any adjacent fuel source area wherein the fuel concentrating means comprises at least two sheet-like bands releasably interconnected to each other, the bands resting upon the fuel supporting surface free from support of the side wall or cooking surface.

2. The device of claim 1 wherein the fuel source is charcoal.

3. The device of claim 2 wherein the bands are releasably interconnected to form four fuel enclosures.

4. The device of claim 1 wherein the bands are releasably interconnected to form substantially equal-sized fuel source area quadrants.

5. The device of claim 1 wherein each of the bands includes an outer edge conforming to and abutting the side wall of the cooking appliance, the relationship between the outer edge and the side wall creating a firestop between the outer edge and the side wall.

6. The device of claim 1 wherein each of the bands include at least one slot formed therein, each slot receivable within another slot to releasably interconnect each band to another.

7. The device of claim 1 wherein the bands further comprise a top edge, a bottom edge opposite the top edge, a first side edge between the top edge and the bottom edge and a second side edge opposite the first edge, and a score line extending between the top edge and the bottom edge for removing a portion of the member adjacent the second edge wherein the device is insertable in differently-sized fireboxes.

8. The device of claim 1 wherein the bands further comprise a top edge, a bottom edge opposite the top edge, a first side edge between the top edge and the bottom edge and a second side edge opposite the first edge, the second edge having a curve to accommodate a cooking appliance side wall which is correspondingly curved, and an extension element rotatably mounted to the band adjacent the second edge such that the element is rotatable creating a secondary second edge to accommodate a cooking appliance side wall which is correspondingly substantially straight.

9. The device of claim 1 wherein the concentrating means comprise four band members, each band member having a top edge, a bottom edge opposite and substantially parallel to the top edge, a first side edge between the top and bottom edges, a second side edge opposite the first edge, and at least one slot formed therein, the slots being positioned and spaced to releasably interconnect the band members to form the device having four fuel enclosures and such that the second side edge adjacent the cooking appliance side wall, the second side edge being curved to conform to a cooking appliance side wall of corresponding curvature thereby creating a firestop between the side wall and the second edge.

10. The device of claim 9 wherein the four band members are assembled such that the first side edge is adjacent the cooking appliance side wall, the first side edge being substantially perpendicular to the top and bottom edges, the first edge conforming to a cooking appliance side wall which is substantially straight.

11. The device of claim 1 wherein concentrating means comprise three band members, each band member having a top edge, a bottom edge opposite and substantially parallel to the top edge, a first side edge and a second side edge between the top and bottom edges, and at least one slot formed therein, at least one of the slots in at least one of the band members being substantially centered between the first and second side edges, all of the slots being positioned and spaced to releasably interconnect the band members to form the device having four fuel enclosures.

12. The device of claim 1 wherein the band members comprise a material consisting of metal or metal alloy.

13. The device of claim 1 wherein the band members have a height when positioned with a cooking grill of approximately two inches to six inches.

14. A method of concentrating and conserving fuel in a cooking appliance, the cooking appliance having a fuel supporting surface, an appliance side wall about the fuel supporting surface and a cooking surface supported substantially between the side wall and above the fuel supporting surface, the cooking surface receiving food items to be cooked, the method comprising:

provided at least two band members releasably interconnectable to each other;

forming a concentrating device with the band members, the device comprising four fuel enclosures for loading fuel;

igniting the fuel in at least one of the fuel enclosures;

wherein the ignition of the fuel in the desired fuel source area maintains the remaining fuel source in an unignited state.

15. The method of claim 14 and further comprising forming a concentrating device comprising four substantially equal fuel source area quadrants.

* * * * *